(12) United States Patent
McEneany et al.

(10) Patent No.: US 11,377,525 B2
(45) Date of Patent: Jul. 5, 2022

(54) COLOR-CHANGING POLYMERIC MATERIAL

(71) Applicant: Kimberly-Clark Worldwide, Inc., Neenah, WI (US)

(72) Inventors: Ryan J. McEneany, Appleton, WI (US); Vasily A. Topolkaraev, Appleton, WI (US); Neil T. Scholl, Neenah, WI (US); Antonio J. Carrillo Ojeda, Appletong, WI (US); Brent M. Thompson, Oshkosh, WI (US)

(73) Assignee: Kimberly-Clark, Worldwide, Inc., Neenah, WI (US)

( * ) Notice: Subject to any disclaimer, the term of this patent is extended or adjusted under 35 U.S.C. 154(b) by 9 days.

(21) Appl. No.: 15/765,506

(22) PCT Filed: Dec. 14, 2016

(86) PCT No.: PCT/US2016/066526
§ 371 (c)(1),
(2) Date: Apr. 3, 2018

(87) PCT Pub. No.: WO2017/106267
PCT Pub. Date: Jun. 22, 2017

(65) Prior Publication Data
US 2019/0071547 A1  Mar. 7, 2019

Related U.S. Application Data

(60) Provisional application No. 62/268,528, filed on Dec. 17, 2015.

(51) Int. Cl.
*C08J 3/22* (2006.01)
*C08J 5/18* (2006.01)
(Continued)

(52) U.S. Cl.
CPC .......... *C08J 3/226* (2013.01); *B29C 44/5627* (2013.01); *B65D 55/06* (2013.01); *C08J 5/18* (2013.01);
(Continued)

(58) Field of Classification Search
None
See application file for complete search history.

(56) References Cited

U.S. PATENT DOCUMENTS 2,820,735 A * 1/1958 Amborski ............... B32B 27/00
156/308.6
4,368,295 A * 1/1983 Newton ................. C08L 67/02
525/166
(Continued)

FOREIGN PATENT DOCUMENTS

| CN | 101057164 | 10/2007 |
|---|---|---|
| WO | WO 2014/199273 A1 | 12/2014 |
| WO | WO 2015/019202 A1 | 12/2015 |

OTHER PUBLICATIONS

International Preliminary Report on Patentability dated Aug. 23, 2018, 6 pages.
(Continued)

*Primary Examiner* — Tae H Yoon
(74) *Attorney, Agent, or Firm* — Dority & Manning, P.A.

(57) ABSTRACT

A color-changing polymeric material is provided. The material is formed from a thermoplastic composition containing a continuous phase that includes a matrix polymer, colorant, microinclusion additive, and nanoinclusion additive, wherein the microinclusion additive and nanoinclusion additive are dispersed within the continuous phase in the form of discrete domains. A porous network is formed in the polymeric material when subjected to a deformational strain in a solid state. The polymeric material exhibits a first color prior to being subjected to the deformational strain and a second
(Continued)

color after being subjected to the deformational strain, the first color being different than the second color.

15 Claims, 4 Drawing Sheets

(51) Int. Cl.

| | | |
|---|---|---|
| C08J 9/00 | (2006.01) | |
| B29C 44/56 | (2006.01) | |
| C08K 3/04 | (2006.01) | |
| C08L 67/04 | (2006.01) | |
| C08L 101/00 | (2006.01) | |
| B65D 55/06 | (2006.01) | |

(52) U.S. Cl.
CPC ............ *C08J 9/0061* (2013.01); *C08L 67/04* (2013.01); *C08L 101/00* (2013.01); *C08J 2367/04* (2013.01); *C08J 2423/08* (2013.01); *C08J 2423/16* (2013.01); *C08J 2463/00* (2013.01)

(56) References Cited

U.S. PATENT DOCUMENTS

| | | | |
|---|---|---|---|
| 4,424,911 A | 1/1984 | Resnick | |
| 4,511,052 A | 4/1985 | Klein et al. | |
| 4,797,468 A | 1/1989 | De Vries | |
| 4,937,299 A | 6/1990 | Ewen et al. | |
| 4,986,429 A | 1/1991 | Singleton, Jr. | |
| 5,218,071 A | 6/1993 | Tsutsui et al. | |
| 5,272,236 A | 12/1993 | Lai et al. | |
| 5,278,272 A | 1/1994 | Lai et al. | |
| 5,322,728 A | 6/1994 | Davey et al. | |
| 5,470,944 A | 11/1995 | Bonsignore | |
| 5,472,775 A | 12/1995 | Obijeski et al. | |
| 5,539,056 A | 7/1996 | Yang et al. | |
| 5,571,619 A | 11/1996 | McAlpin et al. | |
| 5,596,052 A | 1/1997 | Resconi | |
| 5,770,682 A | 6/1998 | Onara et al. | |
| 5,811,493 A * | 9/1998 | Kent .......................... C08J 5/18 521/138 |
| 5,821,327 A | 10/1998 | Oota et al. | |
| 5,880,254 A | 3/1999 | Ohara et al. | |
| 6,090,325 A | 7/2000 | Wheat et al. | |
| 6,326,458 B1 | 12/2001 | Gruber et al. | |
| 6,500,563 B1 | 12/2002 | Datta et al. | |
| 7,273,894 B2 | 9/2007 | Shelby et al. | |
| 8,435,924 B2 | 5/2013 | Arora et al. | |
| 9,289,528 B2 | 3/2016 | Nair et al. | |
| 9,957,369 B2 * | 5/2018 | Topolkaraev ........... C08L 23/10 |
| 2007/0004813 A1 * | 1/2007 | Shelby ................. B29C 55/005 521/134 |
| 2009/0082499 A1 * | 3/2009 | Nishida ...................... C08J 5/18 524/195 |
| 2013/0210621 A1 * | 8/2013 | Topolkaraev .............. C08J 5/18 502/402 |
| 2015/0004707 A1 | 1/2015 | Nair et al. | |
| 2016/0177044 A1 | 6/2016 | Topolkaraev et al. | |
| 2016/0177048 A1 | 6/2016 | Topolkaraev et al. | |

OTHER PUBLICATIONS

Wang et al., "Strain whitening of a thermoplastic olefin material," J. Mater. Sci., vol. 41, 2006, pp. 4847-4859.
International Search Report and Written Opinion for PCT/US2016/066526 dated Mar. 31, 2017, 13 pages.
European Search Report for EP16876535 dated Jun. 7, 2019, 6 pages.
Edited by H. S. Katz, et al., Translated by Li Zuobang, et al, Handbook of Fillers and Reinforcers for Plastics, Chemical Industry Press, 1$^{st}$. edition, pp. 24-25.
Zhao Junhui, et al., Polymer Chemistry and Physics, China Light Industry Press, 1$^{st}$. edition, pp. 134-135.
Chinese Office Action Corresponding to Application No. 201680070298 dated Mar. 13, 2020.

* cited by examiner

COLOR-CHANGING POLYMERIC MATERIAL

RELATED APPLICATIONS

The present application is the national stage entry of international Patent Application No. PCT/US2016/066526 having a filing date of Dec. 14, 2016, which claims priority to U.S. provisional application Ser. No. 62/268,528, filed on Dec. 17, 2015, which are incorporated herein in their entirety by reference thereto.

BACKGROUND OF THE INVENTION

Color-changing polymeric materials are often used to help provide a visual cue to a user of a condition of a product. Tamper-proof seals, for instance, sometimes employ materials that change color when absorbing chemicals released by pressure applied to the container, or from ambient atmosphere conditions exposed to the material during opening. Typical examples of such tamper-proof seals are described in U.S. Pat. Nos. 4,424,911; 4,511,052; and 4,986,429. The color change mechanism employed by these types of tamper-proof seals generally relies upon a chemical reaction with certain substances. Unfortunately, however, the use of such chemical substances can add to the manufacturing cost of the product and also leak out of the material into the ambient environment. As such, a need currently exists for improved color-changing polymeric materials for use in a wide variety of different types of products.

SUMMARY OF THE INVENTION

In accordance with one embodiment of the present invention, a color-changing polymeric material is disclosed that is formed from a thermoplastic composition containing a continuous phase that includes a matrix polymer, colorant, microinclusion additive, and nanoinclusion additive. The microinclusion additive and nanoinclusion additive are dispersed within the continuous phase in the form of discrete domains. A porous network is formed in the polymeric material when subjected to a deformational strain in a solid state. The polymeric material exhibits a first color prior to being subjected to the deformational strain and a second color after being subjected to the deformational strain.

In accordance with another embodiment of the present invention, a method for initiating a color change in a polymeric material is disclosed. The polymeric material is formed from a thermoplastic composition containing a continuous phase that includes a matrix polymer, colorant, microinclusion additive, and nanoinclusion additive, wherein the microinclusion additive and nanoinclusion additive are dispersed within the continuous phase in the form of discrete domains. The polymer material initially exhibits a first color. The method comprises subjecting the polymeric material to a deformational strain at a temperature of from about 0° C. to about 60° C. to form a porous network in the polymeric material. The polymeric material exhibits a second color after being subjected to the deformational strain that is different than the first color.

In accordance with another embodiment of the present invention, a method for initiating a color change in a polymeric material is disclosed. The polymeric material is formed from a thermoplastic composition containing a continuous phase that includes a matrix polymer, colorant, microinclusion additive, and nanoinclusion additive, wherein the microinclusion additive and nanoinclusion additive are dispersed within the continuous phase in the form of discrete domains. A porous network is defined within the polymeric material that contains a plurality of pores, and the polymeric material exhibits an initial color. The method comprises treating the material to reduce the size of one or more of the pores, wherein the treated polymeric material exhibits a color after being subjected to the deformational strain that is different than the initial color.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
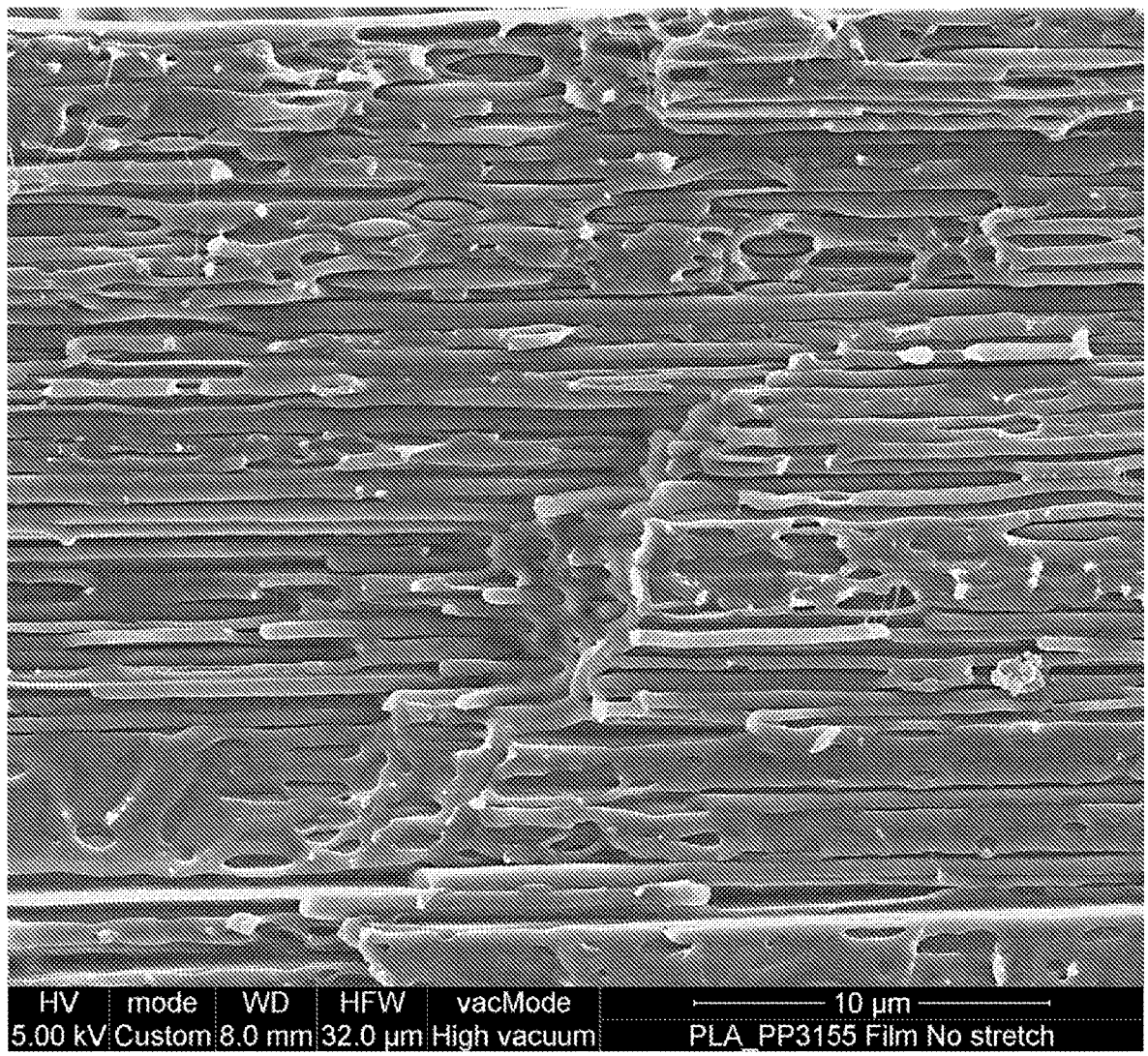
FIGS. 1-2 are SEM microphotographs of a film of Example 1 prior to being subjected to a deformational strain (e.g., drawing), where a film was cut perpendicular to the machine direction in FIG. 1 and parallel to the machine direction in FIG. 2.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a polymeric material that is capable of undergoing a color change during use to provide a visual cue to a user of a certain attribute of the material. This unique characteristic can be achieved for a single, monolithic polymeric material through selective control over the manner in which the material is formed. That is, the polymeric material is formed from a thermoplastic composition that contains a matrix polymer, microinclusion additive, nanoinclusion additive, and colorant (e.g., pigment). The microinclusion and nanoinclusion additives are selected so that they have a different elastic modulus than the matrix polymer. In this manner, the microinclusion and nanoinclusion additives can become dispersed within the continuous phase as discrete micro-scale and nano-scale phase domains, respectively.

Thus, in its initial unstrained state, the polymeric material will generally have a first color that corresponds to the color of the colorant. For example, when carbon black particles are employed, the polymeric material may initially have a black color. The present inventors have discovered, however, that subjecting the polymeric material to deformational strain under certain conditions can alter its color. More particularly, straining can result in the formation of intensive localized shear regions and/or stress intensity regions (e.g., normal stresses) near the micro-scale discrete phase domains as a result of stress concentrations that arise from the incompatibility of the materials. These shear and/or stress intensity regions may cause some initial debonding in the polymer matrix adjacent to the micro-scale domains. Notably, however, localized shear and/or stress intensity regions may also be created near the nano-scale discrete phase domains that overlap with the micro-scale regions. Such overlapping shear and/or stress intensity regions cause even further debonding to occur in the polymer matrix, thereby creating a substantial number of pores adjacent to the nano-scale domains and/or micro-scale domains.

As a result of this debonding, a porous network can thus be formed within the polymeric material. The formation of the porous network can cause light to scatter and result in a "whitening effect" of the color of the polymeric material. Consequently, at least a portion of the strained polymeric material, if not the entire material, will generally have a second color that is substantially different than the first color—i.e., the color of the material in its pre-strained state. The relative degree of contrast between the first and second color may characterized by a gray-level difference value, which may be determined using any known image analysis system, such as a Quantimet Q600 Image Analysis System (Leica Microsystems). A control or "blank" white-level may be set using undeveloped Polaroid photographic film. An 8-bit gray-level scale may then be used (0-255) and the program allowed the light level to be set by using the photographic film as the standard. A region containing the other color (e.g., background or foreground) may then be measured for its gray-level value, followed by the same measurement of the activate carbon ink. The routine may be programmed to automatically calculate the gray-level value of the polymeric material. The difference in gray-level value between the first color (pre-strained) and the second color (strained) of the polymeric material may be about 50 or greater, and in some embodiments, about 100 or more, as determined on a scale of 0-255 where 0 represents "black" and 255 represents "white." For instance, the first color may be black and the second color may be white or gray.

The nature of the deformational strain needed to impart the change of color from the first color to the second color may vary as desired. For instance, the polymeric material may be drawn, physically manipulated (e.g., twisted, bent, torn, impacted, etc.), and so forth. Regardless, the material is generally strained in a solid state in the sense that it is kept at a temperature ("straining temperature") below the melting temperature of the matrix polymer. For example, straining may occur at ambient temperatures. Among other things, this helps to ensure that the polymer chains are not altered to such an extent that the porous network becomes unstable. For example, the material may be strained at a temperature of from about 0° C. to about 60° C., in some embodiments from about 1° C. to about 50° C., and in some embodiments, from about 5° C. to about 40° C. The straining temperature may also be below the glass transition temperature of the component having the highest glass transition temperature (e.g., matrix polymer, microinclusion additive, nanoinclusion additive, etc.). For example, the straining temperature may be at least about 10° C., in some embodiments at least about 20° C., and in some embodiments, at least about 30° C. below the glass transition temperature of the matrix polymer, nanoinclusion additive, and/or microinclusion additive.

Because the color change can occur at relatively low temperatures, this feature can be relied upon to provide a visual cue to a person during use of the polymeric material. In one embodiment, for example, the polymeric material may be employed in a tamper-resistant seal. In such embodiments, the material may initially possess the color of the colorant (e.g., black) prior to being subjected to deformational strain. However, when a user physically manipulates the seal (e.g., twist, tear, etc.), the resulting deformational strain causes pores to be formed in the polymeric material, which alters the color of the material and provides a visual cue to the user that the seal has been broken.

Of course, it should be understood that the present invention is not limited to the use of a "post-voided" polymeric material for providing the desired visual cue. In certain embodiments, for instance, the polymeric material may be subjected to deformational strain (e.g., drawn) prior to use. In this manner, at least a portion of the polymeric material will initially have the second color due to the presence of pores therein. During use of the material, however, the size of some or all of these pores can be reduced using a variety of different treatments, such as by heat treatment, physical manipulation (e.g., twist, tear, bend, impact, pressure, etc.), and so forth. When the pores are reduced in size or destroyed in this manner, the aforementioned "whitening effect" is lessened so that a least a portion of the polymeric material exhibits a third color that is substantially similar or even identical to the initial first color of the material. The difference in gray-level value between the first color (pre-strained) and the third color (after treatment) of the polymeric material may, for example, be less than about 50, and in some embodiments, less than about 40. For instance, both the first and third colors may be black. Likewise, the difference in gray-level value between the third color (after treatment) and the second color (strained) of the polymeric material may be about 50 or greater, and in some embodiments, about 100 or more. The color change exhibited by such "pre-voided" polymeric materials can provide a visual cue to a user in a wide variety of different applications. In one embodiment, for example, example, the polymeric material may be employed in a thermal sensor. In such embodiments, the voided material may possess a white or grey color due to the whitening effect of the porous network. After being subjected to heat, however, the size of some or all of the pores are reduced so that the color of the polymeric material is altered (e.g., black), which provides a visual cue to the user of a temperature increase.

Various embodiments of the present invention will now be described in more detail.

I. Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about 99 wt. %, in some embodiments from about 75 wt. % to about 98 wt. %, and in some embodiments, from about 80 wt. % to about 95 wt. % of the thermoplastic composition. The nature of the matrix polymer(s) used to form the continuous phase is not critical and any suitable polymer may generally be employed, such as polyesters, polyolefins (e.g., propylene homopolymer, copolymer of ethylene or propylene with an α-olefin, ethylene-propylene copolymers, etc.), styrenic polymers, polyamides, etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

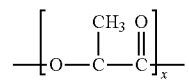

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm") or less, in some embodiments about 200 ppm or less, in some embodiments from about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive" generally refers to any amorphous, crystalline, or semi-crystalline material that is capable of being dispersed within the polymer matrix in the form of discrete domains of a microscale size. For example, prior to straining, the domains may have an average cross-sectional dimension of from about 0.05 μm to about 30 μm, in some embodiments from about 0.1 μm to about 25 μm, in some embodiments from about 0.5 μm to about 20 μm, and in some embodiments from about 1 μm to about 10 μm. The term "cross-sectional dimension" generally refers to a characteristic dimension (e.g., width or diameter) of a domain, which is substantially orthogonal to its major axis (e.g., length) and also typically substantially orthogonal to the direction of the stress applied during straining. While typically formed from the microinclusion additive, it should be also understood that the micro-scale domains may also be formed from a combination of the microinclusion and nanoinclusion additives and/or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the polymeric material upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
$\Delta H_v$ = heat of vaporization
R = Ideal Gas constant
T = Temperature
$V_m$ = Molecular Volume The Hildebrand solubility parameters for many polymers are also available from the Solubility Handbook of Plastics, by Wyeych (2004), which is incorporated herein by reference.

The microinclusion additive may also have a certain melt flow rate (or viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 200 MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to straining, the domains may have an average cross-sectional dimension of from about 1 to about 1000 nanometers, in some embodiments from about 5 to about 800 nanometers, in some embodiments from about 10 to about 500 nanometers, and in some embodiments from about 20 to about 200 nanometers. It should be also understood that the nano-scale domains may also be formed from a combination of the microinclusion and nanoinclusion additives and/or other components of the composition. The nanoinclusion additive is typically employed in an amount of from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from any linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics, polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via a hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

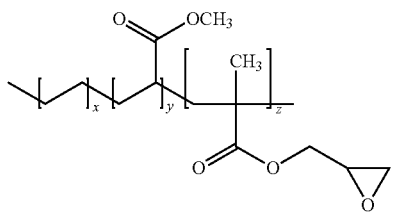

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the matrix polymer employed in the composition. The polyepoxide may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers, cyanide-functionalized polymers, etc. When employed, such reactive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthetic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquaternary ammonium compounds that are capable of exchanging cations with the clay, such as dimethyl bis[hydrogenated tallow] ammonium chloride (2M2HT), methyl benzyl bis[hydrogenated tallow] ammonium chloride (MB2HT), methyl tris[hydrogenated tallow alkyl] chloride (M3HT), etc. Examples of commercially available organic nanoclays may include, for instance, Dellite® 43B (Laviosa Chimica of Livorno, Italy), which is a montmorillonite clay modified with dimethyl benzylhydrogenated tallow ammonium salt. Other examples include Cloisite® 25A and Cloisite® 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanonclusion additives in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

D. Colorant

A colorant is also employed in the thermoplastic composition, typically in an amount of from about 0.05 wt. % to about 8 wt. %, in some embodiments from about 0.1 wt. % to about 4 wt. %, and in some embodiments, from about 0.2 wt. % to about 2 wt. % of the composition. The colorant may include one or more pigments and/or one or more dyes to impart the desired color to the polymeric material, such as black, yellow, cyan, magenta, red, green, blue, etc. Suitable pigments may include, for instance, inorganic pigments (e.g., titanium dioxide, ultramarine blue, cobalt blue, etc.), organic pigments, carbon pigments (e.g., carbon black, activated carbon, etc.), and so forth. Exemplary organic dye classes include triarylmethyl dyes, monoazo dyes, thiazine dyes, oxazine dyes, naphthalimide dyes, azine dyes, cyanine dyes, indigo dyes, coumarin dyes, benzimidazole dyes, paraquinoidal dyes, fluorescein dyes, diazonium salt dyes, azoic diazo dyes, phenylenediamine dyes, diazo dyes, anthraquinone dyes, trisazo dyes, xanthene dyes, proflavine dyes, sulfonaphthalein dyes, phthalocyanine dyes, carotenoid dyes, carminic acid dyes, azure dyes, acridine dyes, and so forth. In one particular embodiment, the colorant may include a black pigment, such as carbon black particles. The average size (e.g., diameter) of the particles may, for instance, range from about 1 to about 200 nanometers, in some embodiments from about 5 to about 150 nanometers, and in some embodiments, from about 10 to about 100 nanometers.

If desired, a carrier resin may also be employed to encapsulate the colorant. While any known carrier resin may be employed for this purpose, in particular embodiments, the carrier resin may be an olefin polymer, such as described above. If desired, the carrier resin may be pre-blended with the colorant to form a masterbatch, which can later be combined with other components of the thermoplastic composition. When employed, the carrier resin typically constitutes from about 50 wt. % to about 95 wt. %, in some embodiments from about 60 wt. % to about 90 wt. %, and in some embodiments, from about 70 wt. % to about 85 wt. % of the masterbatch, and the colorant typically constitute from about 5 wt. % to about 50 wt. %, in some embodiments from about 10 wt. % to about 40 wt. %, and in some embodiments, from about 15 wt. % to about 30 wt. % of the masterbatch. Of course, other components may also be incorporated into the masterbatch.

E. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the matrix polymer. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and pore-initiating fillers (e.g., calcium carbonate). In fact, the thermoplastic composition may be generally free of blowing agents and/or pore-initiating fillers. For example, such blowing agents and/or fillers may be present in an amount of no more than about 1 wt. %, in some embodiments no more than about 0.5 wt. %, and in some embodiments, from about 0.001 wt. % to about 0.2 wt. % of the thermoplastic composition.

II. Polymeric Material

The polymeric material of the present invention may have a variety of different forms depending on the particular application, such as films, fibrous materials, molded articles, profiles, etc., as well as composites and laminates thereof. In one embodiment, for example, the polymeric material is in the form of a film or layer of a film. Multilayer films may contain from two (2) to fifteen (15) layers, and in some embodiments, from three (3) to twelve (12) layers. Such multilayer films normally contain at least one base layer and at least one additional layer (e.g., skin layer), but may contain any number of layers desired. For example, the multilayer film may be formed from a base layer and one or more skin layers, wherein the base layer and/or skin layer(s) are formed from the polymeric material of the present invention. It should be understood, however, that other polymer materials may also be employed in the base layer and/or skin layer(s), such as polyolefin polymers. The thickness of the film may be relatively small to increase flexibility. For example, the film may have a thickness of from about 1 to about 200 micrometers, in some embodiments from about 2 to about 150 micrometers, in some embodiments from about 5 to about 100 micrometers, and in some embodiments, from about 10 to about 60 micrometers.

In addition to a film, the polymeric material may also be in the form of a fibrous material or a layer or component of a fibrous material, which can include individual staple fibers or filaments (continuous fibers), as well as yarns, fabrics, etc. formed from such fibers. Yarns may include, for instance, multiple staple fibers that are twisted together ("spun yarn"), filaments laid together without twist ("zero-twist yarn"), filaments laid together with a degree of twist, single filament with or without twist ("monofilament"), etc. The yarn may or may not be texturized. Suitable fabrics may likewise include, for instance, woven fabrics, knit fabrics, nonwoven fabrics (e.g., spunbond webs, meltblown webs, bonded carded webs, wet-laid webs, airlaid webs, coform webs, hydraulically entangled webs, etc.), and so forth. Fibers formed from the thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer such as polyesters, e.g., polylactic acid, polyethylene terephthalate, polybutylene terephthalate, and so forth; polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes.

Regardless of its particular form, the polymeric material of the present invention is generally formed from the thermoplastic composition, which includes the matrix polymer, microinclusion additive, nanoinclusion additive, colorant, as well as other optional components. To form the initial thermoplastic composition, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

The resulting melt blended composition may contain micro-scale domains of the microinclusion additive and nano-scale domains of the nanoinclusion additive as described above. The colorant may be included within the matrix polymer phase and/or one or more of the domains.

The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 300° C., in some embodiments from about 185° C. to about 250° C., and in some embodiments, from about 190° C. to about 240° C. Likewise, the apparent shear rate during melt processing may range from about 10 s$^{-1}$ to about 3000 s$^{-1}$, in some embodiments from about 50 s$^{-1}$ to about 2000 s$^{-1}$, and in some embodiments, from about 100 s$^{-1}$ to about 1200 s$^{-1}$. The apparent shear rate may be equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficiently high to disperse the microinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Porous Network

As indicated above, a porous network is formed by subjecting the polymeric material to deformational strain. The strain may be applied before the material is used ("pre-voided") and/or during use ("post-voided").

Pre-voided polymeric materials are typically strained using a drawing technique. For example, the material may be drawn in the longitudinal direction (e.g., machine direction), transverse direction (e.g., cross-machine direction), etc., as well as combinations thereof. To perform the desired drawing, the thermoplastic composition may be formed into a precursor shape, drawn, and thereafter converted into the desired material (e.g., film, fiber, etc.). In one embodiment, the precursor shape may be a film having a thickness of from about 1 to about 5000 micrometers, in some embodiments from about 2 to about 4000 micrometers, in some embodiments from about 5 to about 2500 micrometers, and in some embodiments, from about 10 to about 500 micrometers. As an alternative to forming a precursor shape, the thermoplastic composition may also be drawn in situ as it is being shaped into the desired form for the polymeric material. In one embodiment, for example, the thermoplastic composition may be drawn as it is being formed into a film or fiber.

Various drawing techniques may generally be employed, such as aspiration (e.g., fiber draw units), tensile frame drawing, biaxial drawing, multi-axial drawing, profile drawing, vacuum drawing, etc. In one embodiment, for example, the composition is drawn with a machine direction orienter ("MDO"), such as commercially available from Marshall and Willams, Co. of Providence, R.I. MDO units typically have a plurality of drawing rolls (e.g., from 5 to 8) which progressively draw and thin the film in the machine direction. The composition may be drawn in either single or multiple discrete drawing operations. It should be noted that some of the rolls in an MDO apparatus may not be operating at progressively higher speeds. To draw the composition in the manner described above, it is typically desired that the rolls of the MDO are not heated. Nevertheless, if desired, one or more rolls may be heated to a slight extent to facilitate the drawing process so long as the temperature of the composition remains below the ranges noted above. The degree of drawing depends in part of the nature of the material being drawn (e.g., fiber or film), but is generally selected to ensure that the desired porous network is achieved. In this regard, the composition is typically drawn (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn material by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation. Although the composition is typically drawn without the application of external heat (e.g., heated rolls), such heat might be optionally employed to improve processability, reduce draw force, increase draw rates, and improve fiber uniformity.

As noted above, the porous network may also be formed in the polymeric material during use ("post-voided"). Post-voided polymeric materials may be strained using a variety of techniques. In one embodiment, for example, the material may be physically manipulated, such as stretching, bending, folding, twisting, tearing, impacting, etc. If desired, the polymeric material can be physically deformed (e.g., bent, twisted, etc.) into a three-dimensional configuration having one or more angular displacements. The angular displacements may, for example, range from about 5° to about 250°, in some embodiments from about 10° to about 200°, in some embodiments from about 20° to about 180°, and in some embodiments, from about 30° to about 120°. In certain embodiments, the three-dimensional configuration may possess multiple angular displacements (e.g., 2, 3, 4, etc.), which may lie in the same or different planes.

Straining the material in the manner described above (e.g., drawing) may result in a porous network that may constitute from about 15% to about 80% per cm$^3$, in some embodiments from about 20% to about 70%, and in some embodiments, from about 30% to about 60% per cubic centimeter of the material. The material may also have a relatively low density, such as about 1.2 grams per cubic centimeter ("g/cm$^3$") or less, in some embodiments about 1.0 g/cm$^3$ or less, in some embodiments from about 0.2 g/cm$^3$ to about 0.8 g/cm$^3$, and in some embodiments, from about 0.1 g/cm$^3$ to about 0.5 g/cm$^3$. Notably, a substantial portion of the pores in the network may be of a "nano-scale" size ("nanopores"), such as those having an average cross-sectional dimension of about 800 nanometers or less, in some embodiments from about 5 to about 250 nanometers, and in some embodiments, from about 10 to about 100 nanometers. The term "cross-sectional dimension" generally refers to a characteristic dimension (e.g., width or diameter) of a pore, which is substantially orthogonal to its major axis (e.g., length) and also typically substantially orthogonal to the direction of the stress applied during straining. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the polymeric material. Micropores may also be formed at and around the micro-scale domains during straining that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1.1 to about 15, and in some embodiments, from about 1.2 to about 5. The "axial dimension" is the dimension in the direction of the major axis (e.g., length). The pores (e.g., micropores, nanopores, or both) can be distributed in a substantially homogeneous fashion throughout the material. For example, the pores may be distributed in columns that are oriented in a direction generally perpendicular to the direction in which a stress is applied. These columns may be generally parallel to each other across the width of the material.

Due to the unique nature of the material and the manner in which it is formed, the pores may become distributed within alternating banded areas between which ridges of the polymer matrix are located that extend generally perpendicular to the direction of strain. The ridges can remain relatively uncavitated. The combination of these features can result in a material that has structural integrity due to the presence of the rigid ridges, yet also capable of flexing and dissipating energy due to the presence of the relatively flexible bridges. Among other things, this enhances the flexibility of the material yet allows it to retain a sufficient degree of strength so it can retain the desired shape during use.

In addition to forming a porous network, straining can also significantly increase the axial dimension of the micro-scale domains so that they have a generally linear, elongated shape. For example, the elongated micro-scale domains may have an average axial dimension that is about 10% or more, in some embodiments from about 20% to about 500%, and in some embodiments, from about 50% to about 250% greater than the axial dimension of the domains prior to straining. The axial dimension after straining (e.g., drawing) may, for instance, range from about 0.5 to about 250 micrometers, in some embodiments from about 1 to about 100 micrometers, in some embodiments from about 2 to about 50 micrometers, and in some embodiments, from about 5 to about 25 micrometers. The micro-scale domains may also be relatively thin and thus have a small cross-sectional dimension, such as from about 0.05 to about 50 micrometers, in some embodiments from about 0.2 to about 10 micrometers, and in some embodiments, from 0.5 to about 5 micrometers. This may result in an aspect ratio for the first domains (the ratio of the axial dimension to the cross-sectional dimension) of from about 2 to about 150, in some embodiments from about 3 to about 100, and in some embodiments, from about 4 to about 50.

V. Applications

The pre-voided and post-voided polymeric materials of the present invention may be employed in a wide variety of different applications to provide a visual cue to a person during use of the material. In one embodiment, for example, a post-voided polymeric material may be employed in a tamper-resistant seal. In such embodiments, the material may initially possess the color of the colorant (e.g., black) prior to being subjected to deformational strain. However, when a user physically manipulates the seal (e.g., twist, tear, etc.), the resulting deformational strain causes pores to be formed in the polymeric material, which alters the color of the material and provides a visual cue to the user that the seal has been broken. Such a seal can be used on any type of product desired, such as containers, bottles, packaged products, cartons, etc. In addition to providing a visual cue of tampering with a product, the polymeric material may also be used to provide other types of visual cues. For example, the polymeric material may be used to provide a visual cue of damage to a product, such as in a car seat, sports helmet, etc. The polymeric material may also provide a visual cue of a certain amount of tension, such as in packaging, wrapper, or in an elastic component. In one embodiment, for example, the polymeric material may be employed in an elastic component (e.g., ear) of an absorbent article that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches; and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core.

Of course, as noted above, the present invention is not limited to the use of a "post-voided" polymeric material for providing the desired visual cue. For instance, the polymeric material may be subjected to deformational strain (e.g., drawn) prior to use. In this manner, at least a portion of the polymeric material will initially have the second color due to the presence of pores therein. During use of the material, however, the size of some or all of these pores can be reduced using a variety of different treatments, such as by heat treatment, physical manipulation (e.g., twist, tear, bend, pressure, etc.), and so forth. When the pores are reduced in size or destroyed in this manner, the aforementioned "whitening effect" is lessened so that a least a portion of the polymeric material exhibits a third color that is substantially similar or even identical to the initial first color of the material.

The color change exhibited by such "pre-voided" polymeric materials can provide a visual cue to a user in a wide variety of different applications. In one embodiment, for example, example, the polymeric material may be employed in a thermal sensor. In such embodiments, the voided material may possess a white or grey color due to the whitening effect of the porous network. After being exposed to heat, however, the size of some or all of the pores are reduced so that the color of the polymeric material is altered (e.g., black), which provides a visual cue to the user of a temperature increase. While the degree of heat needed to impart the desired color change may vary, it is typically desired that the polymeric material is exposed to a temperature at or above the glass transition temperature of the polymer matrix, such as at from about 40° to about 200° C., in some embodiments from about 50° C. to about 150° C., and in some embodiments, from about 70° C. to about 120° C. At such temperatures, the polymer will begin to flow and potentially crystallize to cause the pores to destabilize and reduce in size. Thermal sensors may provide a variety of different types of visual cues to a user, such as a visual cue that a food product has cooked sufficiently, a substrate has undergo a certain degree of heat shrinking (e.g., heat shrinking fibers, heat shrinking films, etc.), and so forth. In addition to heat treatment, physical manipulation (e.g., twist, tear, bend, fold, impact, pressure, etc.) can also reduce the size of the pores in a "pre-voided" material and therefore impart the desired color change. For example, the polymeric material can be used as a pressure-sensitive material (e.g., film) where the color change provides a visual cue that a certain pressure has been exerted on the material. The visual cue may also be aesthetic in nature. For example, a "pre-voided" material may be embossed to create a multi-colored visual pattern.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1238-13 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Density and Percent Pore Volume:

To determine density and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated by $W_i \times T_i \times L_i = V_i$. The volume ($V_f$) after drawing may also be calculated by $W_f \times T_f \times L_f = V_f$. The density ($P_f$) may be calculated by: $P_f = P_i / \phi$, where $P_i$ is density of precursor material, and the percent pore volume (% $V_v$) may be calculated by: % $V_v = (1 - 1/\phi) \times 100$.

Example 1

Initially, a thermoplastic composition was formed from 85.3 wt. % polylactic acid (PLA 6201D, Natureworks®), 9.5 wt. % of a microinclusion additive, 1.4 wt. % of a nanoinclusion additive, and 3.8 wt. % of an internal interfacial modifier. The microinclusion additive was Vistamaxx™ 2120 (ExxonMobil), which is a polypropylene-polyethylene copolymer elastomer with a melt flow rate of 29 g/10 min (190° C., 2160 g) and a density of 0.866 g/cm³. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %. The internal interfacial modifier was PLURIOL® WI 285 Lubricant from BASF, which is a polyalkylene glycol functional fluid.

The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 36 µm to 54 µm. The films were stretched in the machine direction to about 100% to initiate cavitation and void formation.

Figure 2:
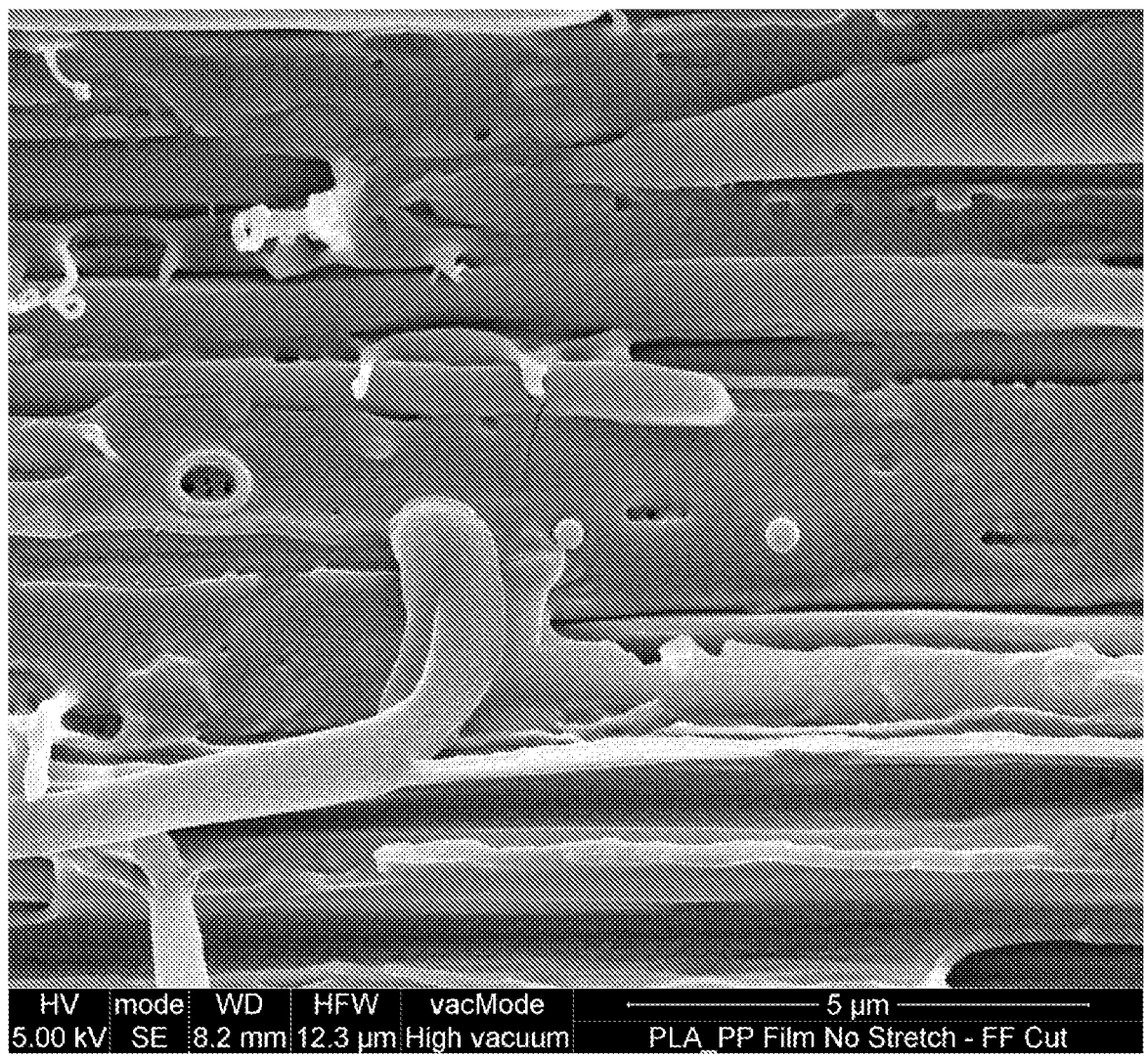
Figure 3:
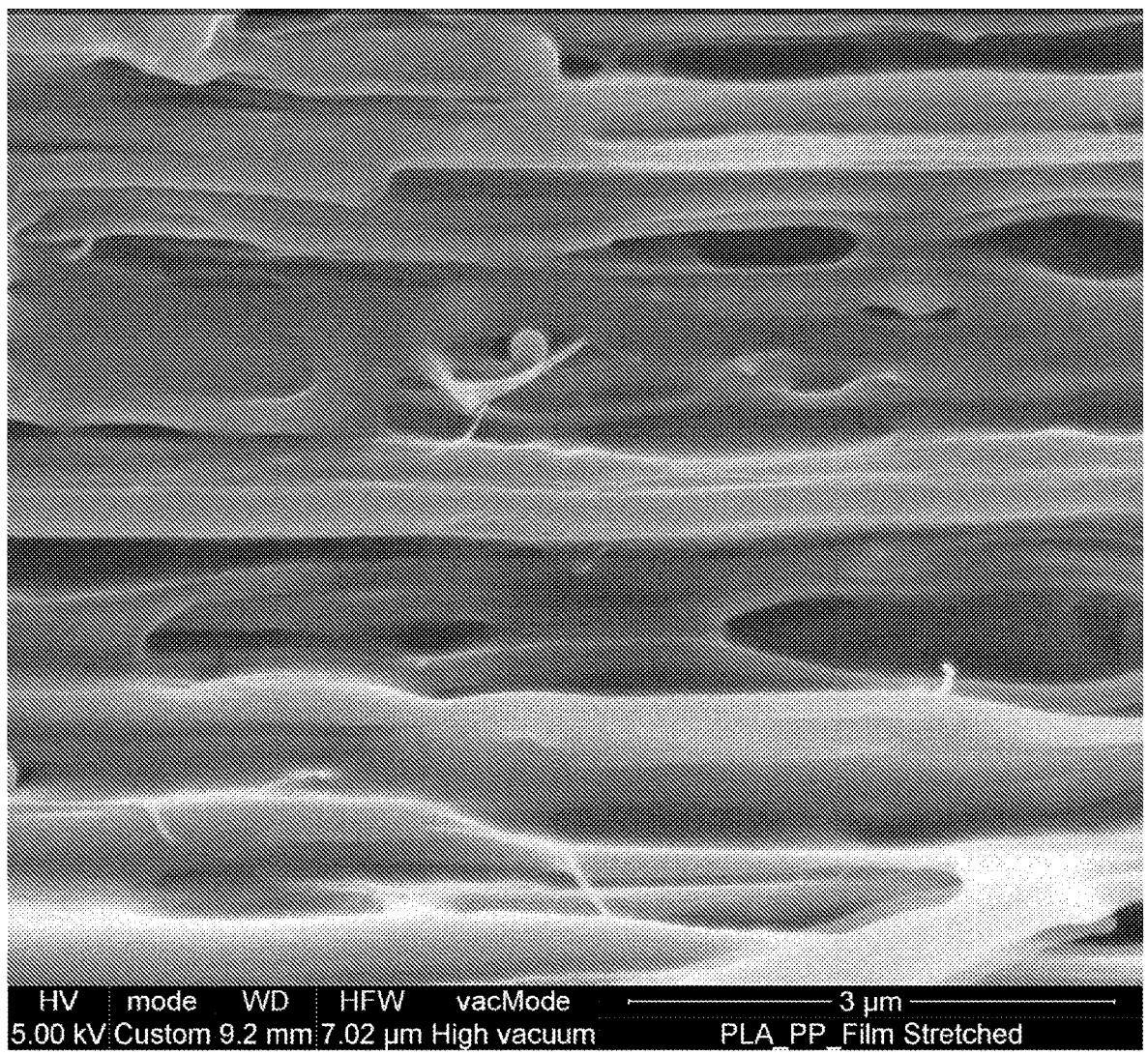
FIGS. 3-4 are SEM microphotographs of the film of Example 1 after being subjected to a deformational strain (drawn), wherein the film was cut parallel to machine direction orientation.
Figure 4:
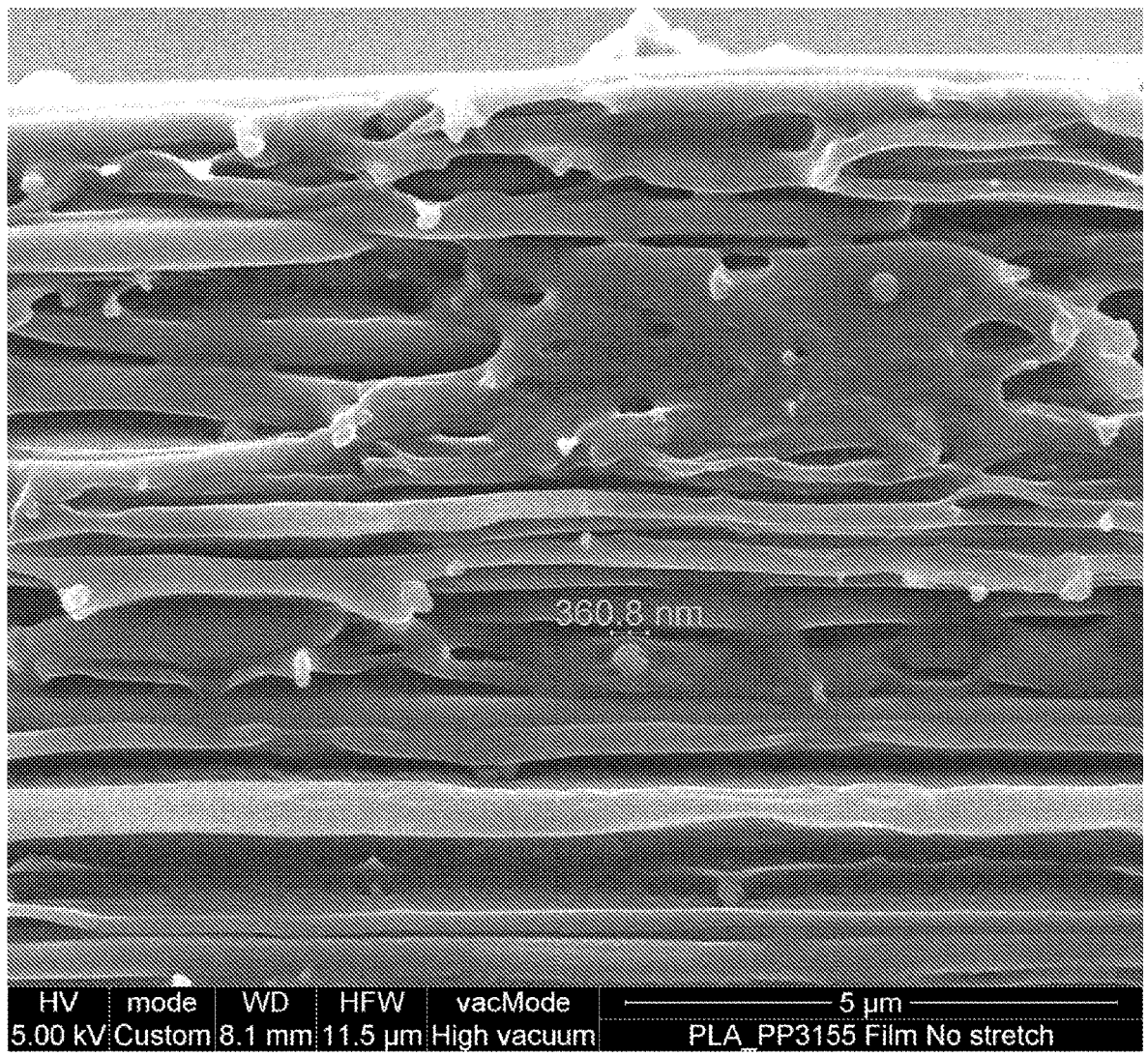

The morphology of the films was analyzed by scanning electron microscopy (SEM) before and after stretching. The results are shown in FIGS. 1-4. As shown in FIGS. 1-2, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 3-4 show the film after stretching. As indicated, pores formed around the inclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

Example 2

The formulation from Example 1 was melt blended with 2 wt. % of a masterbatch of carbon black in a polyethylene carrier (Clariant FDA Black consisting of 10% carbon and 90% polyethylene). The melt blending occurred in a Davis Standard 90 mm single screw extruder at a temperature of 193° C. and a speed 100 rpm. The blend was extruded from the single screw directly into a sheet having a thickness of 500 micrometers and quenched at a temperature of 43° C.

Example 3

The sheet of Example 2 was stretched using an MTS Synergie Tensile Frame to varying elongations at a rate of 25 millimeters per minute, including 5%, 10%, 25%, 50%, 75%, 100%, 125% and 400% in the machine direction and 5%, 10%, 25%, 50%, 75%, 100%, 125% in the cross direction. The level of color change at a given draw was consistent in both the machine and cross direction. At elongation levels above 100% elongation, the shift in color change was less noticeable.

Example 4

The sheet of Example 2 was stretched via a Machine Direction Orientation (MDO) Unit to 50% elongation at an in-feed rate of 5 meters per minute and take up speed of 7.5 meters per minute. Upon stretching, the color changed from a gloss black to a dull gray. The gray sheet material was then subjected to heat generated by a 200 W $CO_2$ laser at a scanning rate of 760 millimeters per second. The duty cycle was varied from 7% to 49%, which represented 50% of the actual power output of the laser. As the laser duty cycle was increased, the sample became a darker gray and eventually black as the duty cycle reached above 30%.

Example 5

A sheet was formed as described in Example 2 except that the carbon black masterbatch was employed in an amount of 4 wt. %. The black sheet sample was then thermoformed at a temperature of 95° C. to produce a rigid flip top container lid. Upon thermoforming, there was no noticeable shift in the color of the lid compared to the original sheet.

Example 6

The sheet of Example 5 was stretched via a Machine Direction Orientation (MDO) Unit to 50% elongation at an in-feed rate of 50 meters per minute and take up speed of 75 meters per minute. Upon stretching, the sheet color changed from gloss black to a dull gray. The gray sheet material was then thermoformed at a temperature of 95° C. to produce a rigid flip top container lid. Upon thermoforming, there was a range of gray colors in the color of the lid compared to the original, which indicated varying levels of void collapse in the thermoformed lid compared to the original sheet.

Example 7

Initially, a thermoplastic composition was formed from 85.3 wt. % polylactic acid (PLA 4043D, Natureworks®), 9.5 wt. % of a microinclusion additive, 1.4 wt. % of a nanoinclusion additive, and 3.8 wt. % of an internal interfacial modifier. The microinclusion additive was PP3155 (ExxonMobil), which is a polypropylene-polyethylene homopolymer with a melt flow rate of 35 g/10 min (230° C., 2160 g) and a density of 0.9 g/cm$^3$. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %. The internal interfacial modifier was Hallgreen® IM-8830 Lubricant from Hallstar, which is a low molecular weight ester based fluid.

The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The Hallgreen® IM-8830 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm").

Example 8

The pellets of Example 7 were dry blended with a masterbatch of carbon black in a polylactic acid carrier (carbon black masterbatch 25% carbon black, 75% PLA 4043D, Ampacet). The carbon black masterbatch was employed in an amount of 4 wt. %. The dry blend of pellets were then flood fed into a signal screw extruder heated to a temperature of 212° C. where the molten blend exited through 150 millimeter width slit die and drawn to a film thickness of 125 micrometers. The films were then stretched via a Machine Direction Orientation (MDO) Unit to 50% elongation at an in-feed rate of 5 meters per minute and take up speed of 7.5 meters per minute. The resulting film had a darker gray to black color, which indicated that providing the pigment in the matrix phase can provide a difference in color appearance compared to the pigment being in the dispersed phase.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for applying a tamper resistant seal to a container, the tamper resistant seal comprising a polymeric material that is formed from a thermoplastic composition containing a continuous phase that includes a matrix polymer, colorant, microinclusion additive, and nanoinclusion additive,
wherein the colorant includes an inorganic pigment, an organic pigment, a carbon pigment, or a combination thereof,
wherein the microinclusion additive and nanoinclusion additive are dispersed within the continuous phase in the form of discrete domains,
wherein a porous network is defined within the polymeric material that contains a plurality of pores, wherein the polymeric material exhibits an initial color, the method comprising:
treating the polymeric material via heat treatment to reduce the size of one or more of the pores; and
applying the tamper resistant seal to a container and the tamper resistant seal exhibiting the initial color when applied to the container and being configured to exhibit a second color when subjected to a deformational strain, the second color being different than the initial color, the second color providing a visual cue of tampering.

2. The method of claim 1, wherein the deformational strain includes exposing the material to a temperature of from about 40° C. to about 200° C.

3. The method of claim 1, wherein the deformational strain includes bending, twisting, tearing, impacting, or applying pressure to the polymeric material.

4. The method of claim 1, wherein the difference in a gray-level value between the initial color and the second color is about 50 or greater, as determined on a scale of 0-255 where 0 represents black and 255 represents white.

5. The method of claim 1, wherein the initial color is black and the second color has a gray-level value of about 50 or more than the initial color, as determined on a scale of 0-255, where 0 represents black and 255 represents white.

6. The method of claim 1, wherein the colorant is present in an amount of from about 0.05 wt. % to about 8 wt. % of the composition.

7. The method of claim 1, wherein the colorant includes carbon black particles.

8. The method of claim 1, wherein the colorant is provided in a masterbatch that contains a carrier resin.

9. The method of claim 1, wherein the matrix polymer includes a polyester or a polyolefin.

10. The method of claim 9, wherein the polyester includes a polylactic acid.

11. The method of claim 1, wherein the nanoinclusion additive is a functionalized polyolefin.

12. The method of claim 1, wherein the nanoinclusion additive comprises a polyepoxide.

13. The method of claim 1, wherein the thermoplastic composition further comprises an interphase modifier.

14. The method of claim 1, wherein the deformational strain is imparted by drawing on the polymeric material.

15. The method of claim 14, wherein drawing on the material polymeric material includes drawing the polymeric material to a draw ratio of from about 1.1 to about 3.5.

* * * * *